United States Patent
Abichandani et al.

(10) Patent No.: US 8,249,604 B2
(45) Date of Patent: Aug. 21, 2012

(54) SYSTEM AND METHOD FOR LANDLINE REPLACEMENT

(75) Inventors: Jaideep Abichandani, Carol Stream, IL (US); Narothum Saxena, Hoffman Estates, IL (US); Michael Irizarry, Algonquin, IL (US)

(73) Assignee: United States Cellular Corporation, Chicago, IL (US)

( * ) Notice: Subject to any disclaimer, the term of this patent is extended or adjusted under 35 U.S.C. 154(b) by 415 days.

(21) Appl. No.: 12/478,540

(22) Filed: Jun. 4, 2009

(65) Prior Publication Data

US 2010/0311416 A1    Dec. 9, 2010

(51) Int. Cl.
*H04W 40/00*    (2009.01)

(52) U.S. Cl. .................. 455/445; 455/435.1; 455/414.1; 455/426.1; 455/461; 455/456.2; 370/328; 370/331; 370/338

(58) Field of Classification Search .................. 455/445, 455/435.1, 414.1, 426.1, 461, 456.2; 370/328, 370/331, 338

See application file for complete search history.

(56) References Cited

U.S. PATENT DOCUMENTS

| | | | |
|---|---|---|---|
| 6,374,102 B1 * | 4/2002 | Brachman et al. ......... | 455/422.1 |
| 2006/0079236 A1 | 4/2006 | Del Pino et al. | |
| 2007/0097939 A1 | 5/2007 | Nylander et al. | |
| 2007/0097983 A1 | 5/2007 | Nylander et al. | |
| 2007/0105527 A1 | 5/2007 | Nylander et al. | |
| 2007/0183427 A1 | 8/2007 | Nylander et al. | |
| 2008/0090595 A1 | 4/2008 | Liu et al. | |
| 2008/0244148 A1 | 10/2008 | Nix, Jr. et al. | |
| 2008/0254833 A1 | 10/2008 | Keevill et al. | |
| 2008/0261563 A1 | 10/2008 | Drevon et al. | |
| 2008/0299903 A1 | 12/2008 | Hirono et al. | |
| 2008/0299992 A1 | 12/2008 | Eitan et al. | |
| 2009/0052395 A1 | 2/2009 | Bao et al. | |
| 2009/0059907 A1 | 3/2009 | Sindhwani et al. | |
| 2009/0061873 A1 | 3/2009 | Bao et al. | |
| 2009/0067417 A1 * | 3/2009 | Kalavade et al. ............ | 370/356 |
| 2009/0156213 A1 * | 6/2009 | Spinelli et al. ................ | 455/436 |
| 2009/0191844 A1 * | 7/2009 | Morgan et al. ................ | 455/411 |
| 2010/0056144 A1 * | 3/2010 | Gallagher et al. ......... | 455/435.1 |
| 2010/0144341 A1 * | 6/2010 | Robbins et al. ............ | 455/426.1 |

OTHER PUBLICATIONS

Airvana Mobile Broadband Everywhere "Femtocells: Transforming The Indoor Experience". (no stated date, but no later than applicant's filing date) (11 Pages).

* cited by examiner

*Primary Examiner* — Kamran Afshar
*Assistant Examiner* — Manpreet Matharu
(74) *Attorney, Agent, or Firm* — Leydig, Voit & Mayer, Ltd

(57) ABSTRACT

A femto cell is provided that automatically routes new communication sessions among the connected mobile and landline handsets based upon local detection of mobile registration with the femto cell, which helps to reduce the backhaul bandwidth requirements and offload backend network processing load. When the mobile handset successfully registers with the femto cell, a User Detection Module at the femto cell routes new calls destined for the mobile telephone number to one or more traditional landline handsets. The femto cell also provides a ring tone to the connected landline handsets for making the outgoing calls. Since the mobile handset remains available for conducting additional communication sessions, the user is able to talk on the landline handset while conducting a simultaneous data session using the mobile phone.

37 Claims, 4 Drawing Sheets

US 8,249,604 B2

SYSTEM AND METHOD FOR LANDLINE REPLACEMENT

FIELD OF THE INVENTION

This invention relates generally to the field of wireless communications and more specifically to enhanced femto cell systems.

BACKGROUND OF THE INVENTION

Femto cells are small cellular base stations, typically located at user premises, which provide indoor cellular coverage and rely on the user's broadband connection for backhaul connection to the service provider's network. The backhaul connection to the service provider's network often includes an interface with an IP Multimedia Subsystem (IMS) network for providing multimedia services, for instance using the Session Initiation Protocol (SIP). Thus, in addition to enhancing indoor coverage, a femto cell provides a mobile telephone user with access to cellular voice and data services using the IP-based backhaul.

Femto cells also provide an opportunity for the user to realize service charge savings by replacing the user's landline telephone service with mobile network access. Since most users are more comfortable with using a traditional landline telephone handset while at home or at the office, it is desirable to integrate the mobile handset with the user's landline handsets while using a single telephone number. However, existing femto cell solutions inflexibly prevent the user from employing both mobile and landline handsets for separate and independent communication sessions by either ringing both the mobile and the landline handsets at the same time, requiring the mobile handset to be turned off in order to deliver a ring tone to the landline handsets, or requiring additional equipment, such as a cradle, for manually parking the mobile handset prior to routing the calls to the user's landline handset system. Additionally, many existing femto cell solutions waste network processing resources and increase network signaling traffic by relying on backend processing for controlling the call routing decisions between the mobile and landline handsets.

For instance, U.S. Publication No. 2006/0079236 uses a backend SIP server to determine whether the mobile is currently registered with a fixed or mobile network for purposes of performing call routing, thereby increasing the backhaul connection signaling traffic and requiring additional bandwidth. Once the call is routed to a wireless broadband router via the fixed network, a web interface at a desktop PC is used to manually select whether the mobile or the local handset will ring (or both). Thus, user input is required for call routing among the connected handsets.

BRIEF SUMMARY OF THE INVENTION

Embodiments of the invention are used to provide a femto cell that automatically routes new communication sessions among the connected mobile and landline handsets based upon local detection of mobile registration with the femto cell, which helps to reduce the backhaul bandwidth requirements and offload backend network processing load. When the mobile handset successfully registers with the femto cell, a User Detection Module at the femto cell routes new calls destined for the mobile telephone number to one or more traditional landline handsets. The femto cell also provides a ring tone to the connected landline handsets for making the outgoing calls. Since the mobile handset remains available for conducting additional communication sessions, the user is able to talk on the landline handset while conducting a simultaneous data session using the mobile phone.

In one aspect of the invention, a method is provided for providing landline replacement in connection with routing a new communication session among a plurality of user devices associated with a femto cell, the method comprising relaying a registration request from a first user device associated with the femto cell, receiving a registration success indication for permitting the first user device to engage in the new communication session via the femto cell, and in response to detecting the registration success indication for the first user device: (a) triggering a user device selector at the femto cell for routing the new communication session among the plurality of user devices, and (b) automatically routing the new communication session to a second user device associated with the femto cell.

In another aspect of the invention, a femto cell is provided for automatically setting up a new communication session for at least one of a plurality of user devices associated with the femto cell, the femto cell comprising (a) a communication interface for engaging in the new communication session with the at least one of the plurality of user devices, the communication interface relaying a registration request from a first user device associated with the femto cell to a mobile telephone network and receiving a registration success indication for permitting the first user device to engage in the new communication session via the femto cell, and (b) a user device selector for routing the new communication session among the plurality of user devices associated with the femto cell, the user device selector automatically routing the new communication session to a second user device associated with the femto cell in response to detecting the registration success indication for the first user device.

In yet another aspect of the invention, a system is provided for landline replacement for a plurality of user devices, the system comprising (a) a mobile telephone network for communicating with at least one of the plurality of user devices, and (b) a femto cell coupled to the mobile telephone network for automatically setting up a new communication session with the at least one of the plurality of user devices, the femto cell relaying a registration request from a first user device associated with the femto cell to the mobile telephone network and receiving a registration success indication for permitting the first user device to engage in the new communication session via the femto cell, the femto cell automatically routing the new communication session to a second user device associated with the femto cell in response to detecting the registration success indication for the first user device.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

The following examples further illustrate the invention but, of course, should not be construed as in any way limiting its scope.

Figure 1:
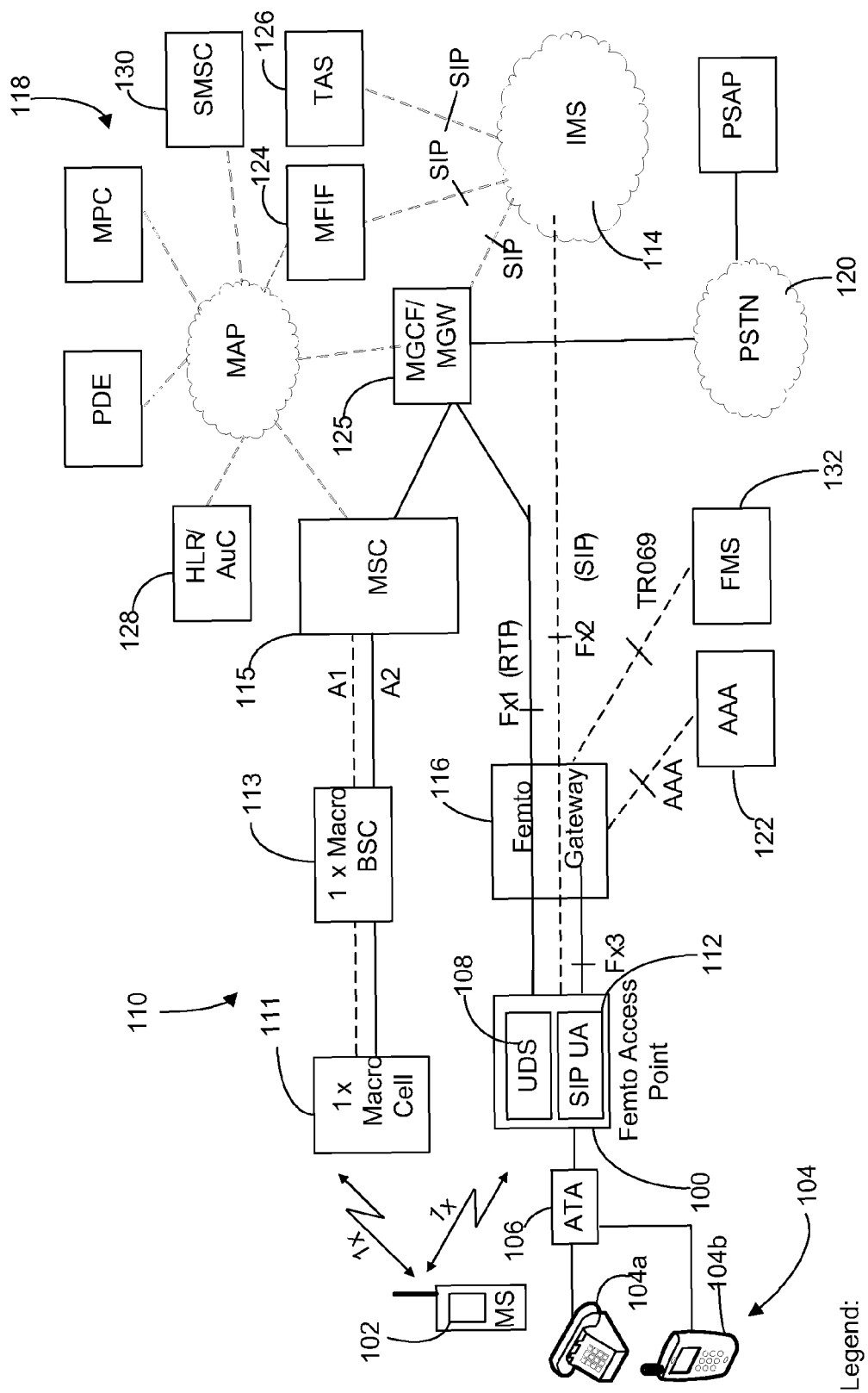
FIG. 1 is a schematic diagram illustrating a femto cell system environment in accordance with an embodiment of the invention.

Turning to FIG. 1, an implementation of an embodiment of a femto cell system for providing a landline telephone service replacement is shown in the context of an overall wireless telephone system environment. The femto cell 100 is located at the user premises, such as at the user's home or office, and comprises a Femto Access Point (FAP) for controlling and interfacing with a plurality of user devices, including one or more mobile telephone handsets 102, as well as a landline handset system 104 that includes one or more wired telephone handsets 104a and one or more cordless telephone handsets 104b. Preferably, the landline handset system 104 connects to the FAP 100 via the Analog Telephone Adapter (ATA) 106, which provides an analog interface to the landline handsets 104a, 104b. To provide a seamless landline replacement service when the mobile user is in the vicinity of the femto cell, the FAP 100 includes a User Device Selector Module 108 for automatically routing new communication sessions for incoming calls set up on the FAP 100 to the traditional handsets 104a, 104b connected to the landline handset system 104. Preferably, when the mobile handset 102 registers with the FAP 100, the FAP 100 routes all the calls destined for the mobile handset 102 to the traditional landline handsets 104a, 104b.

Preferably, the routing of communication sessions in the User Device Selector 108 is based on a mapping of a Mobile Directory Number (MDN) used by a particular mobile handset 102 to one or more communication ports at the ATA 106. The mobile handset's MDN corresponds to a unique IMS Public User Id (IMPU) identifier, while a particular communication port at the ATA 106 is assigned a unique IMS Private User Id (IMPI) identifier. Therefore, when the mobile handset completes registration with the FAP 100, incoming calls destined for the mobile handset's MDN (and corresponding IMPU) are routed to a communication port having a particular IMPI and connected to a corresponding landline handset system. In an embodiment of a system with multiple mobile handsets, each having a unique IMPU identifier, incoming calls to a particular mobile handset's MDN may be configured to be routed to a corresponding landline handset system connected to a specified port of the ATA 106 by mapping the mobile's IMPU identifier to a corresponding IMPI identifier of the desired landline handset system. For instance, incoming calls to the first mobile handset's MDN are routed to the landline handset system (e.g., IMPI 1) connected to the first port of the ATA 106 (e.g., corresponding to the landline handsets serving a particular area of a building or a particular user). Similarly, incoming calls to the second mobile handset's MDN are routed to the landline handset system (e.g., IMPI 2) connected to the second port of the ATA 106 (e.g., corresponding to the landline handsets serving another area of a building or a different user). In yet another embodiment of a system having multiple landline handset systems and a single mobile handset, the User Device Selector 108 may be configured to route communication sessions destined to the mobile handset to a predetermined landline handset system/IMPI, while communication sessions associated with another landline handset system, which is connected to a different port of the ATA 106, are assigned a different number/MDN.

In one embodiment, the mobile handset's registration with the FAP 100 causes the ATA 106 to provide a ring tone to the traditional landline handsets for making the outgoing calls. Alternatively, traditional landline handsets 104a, 104b receive dial tone from the ATA 106 for making outgoing calls even when the mobile handset 102 has not yet registered with the FAP 100. In this case, the mobile handset 102 and the landline handset system 104 share the same MDN (via their respective connections to MSC 115 and IMS core network 114), however the incoming calls are routed to the landline handset system 104 only after the mobile handset has registered with the FAP 100. Once the mobile handset 102 is in the vicinity of the FAP 100, the User Device Selector 108 routes new incoming communication sessions to the traditional landline handsets 104a, 104b pursuant to the mobile handset's successful registration. Since the mobile handset 102 remains registered with the FAP 100, the user is also able to conduct another contemporaneous communication session, such as SMS, email, web browsing, or another voice session, via the mobile handset 102, while placing or receiving a voice call over the traditional landline handset system 104. While the FAP 100 is capable of supporting traditional call waiting functionality by providing a call waiting notification via the landline and mobile handsets involved in a communication session when another incoming call is received, the FAP 100 also includes a configuration where, upon receiving the call waiting notification, the User Device Selector 108 routes a ring tone to the handset that is currently not involved in a communication session. For instance, when the landline handset system 104 is involved in a voice call, the User Device Selector 108 routes a new incoming voice call to the mobile handset 102 upon receipt of the call waiting notification when the mobile handset 102 is idle (and vice versa). This permits the FAP 100 to support multiple simultaneous independent voice sessions.

In a preferred embodiment, the handset selection processing of the User Device Selector Module 108 is local to the FAP 100, which achieves a reduction in network signaling traffic and reduces the computational load on the backend processing. In an alternate embodiment, when centralized policy control with respect to handset selection is desired, the User Device Selection Module 108 is located at a Telephony Application Server 126 connected to the IP Multimedia Subsystem (IMS) session core network 114. In embodiments, the User Device Selector Module 108 also accepts user input for manual selection of call routing among mobile and landline handsets in situations when the user needs to transfer an ongoing call from the mobile to the landline handset or vice versa. Preferably, the User Device Selector Module 108 receives a predetermined access code entered via the mobile or landline handset for transferring an ongoing communication session to the other handset type. For instance, when the user is in process of communicating via the mobile handset and arrives in the vicinity of the femto access point, the user enters a predetermined access code via the mobile handset to cause the User Device Selector 108 to transfer the ongoing communication session to the traditional handset system, after which point the mobile phone is disconnected. This allows the user to transfer the ongoing communication session over the mobile handset to a traditional speakerphone, for example. Likewise, the user enters a predetermined access code via the landline handset to cause the User Device Selection Module 108 to transfer the ongoing call from the landline to the mobile handset, such as when the user desires to continue the conversation outside of the user premises. Once the ongoing communication session is transferred to the mobile handset, the landline handset system is disconnected.

Preferably, the FAP 100 includes a plurality of interfaces for communicating with the mobile handset 102 and the landline handset system 104. In an embodiment, the FAP 100 comprises a micro base station that communicates with the mobile handset 102 via a mobile telephone air interface protocol, such as CDMA 2000 1xRTT (1xRTT). However, those skilled in the art will realize that additional air interfaces are possible depending on the type of macro wireless access network 110 on which the mobile handset 102 is designed to operate. For instance, embodiments of the communication interface associated with the macro wireless access network 110 and the mobile handset 102 include GSM, UMTS, W-CDMA, and LTE air interfaces, to name a few. The macro wireless access network 110 includes a plurality of macro base stations 110 controlled by one or more Base Station Controllers (BSC) 113 and Mobile Switching Centers (MSC) 115, which, in turn, interface with the mobile core network 118, IMS session core network 114, and Public Switched Telephone Network (PSTN) 120 for providing voice, data, signaling, and application services integration.

The FAP 100 provides coverage in a geographically limited area, such as the user's residence or office. The FAP 100 also comprises a Session Initiation Protocol (SIP) user agent ("SIP UA") 112 for interfacing with the IMS session core network 114 and wireless access network 110 via a femto gateway 116. The FAP 100 provides access to the users of the macro wireless access network 110 by providing a conversion between the voice and signaling data conveyed over the wireless air interface and IMS-based Voice-Over-IP (VOIP) and SIP signaling traffic. Preferably, the FAP 100 converts and encapsulates signaling and Enhanced Variable Rate Coder (EVRC)-encoded voice packets arriving via the air interface (e.g., 1xRTT) to SIP signaling and RTP voice traffic, respectively. The RTP-encapsulated voice traffic flows between the femto gateway 116 and the Media Gateway 125, while SIP signaling flows between the femto gateway 116 and the IMS session core network 114. The femto gateway 116, employs an IPSEC protocol to provide security and aggregation functionality in order for the FAP 100 to access the mobile core network 118, such as the CDMA 2000 core network. The femto gateway 116 is responsible for allocating an IP address to the FAP 100 from the serving macro wireless network 110, including the mobile core network 118. The femto gateway 116 also encapsulates and de-capsulates traffic passing through the FAP 100 and performs femto level authentication and transfer of authorization policy information through the Authentication, Authorization and Accounting (AAA) server 122. The MAP-Femto Interworking Function (MFIF) 124 provides interworking between the FAP 100 that is supporting the 1xRTT mobile handset 102, the SIP protocol-based environment of the IMS session core 114 (including any associated telephony services or applications provided by the Telephony Application Server 126), the Home Location Register (HLR) 128, the Short Message Service Center (SMSC) 130, and the MSC 115.

Figure 2:
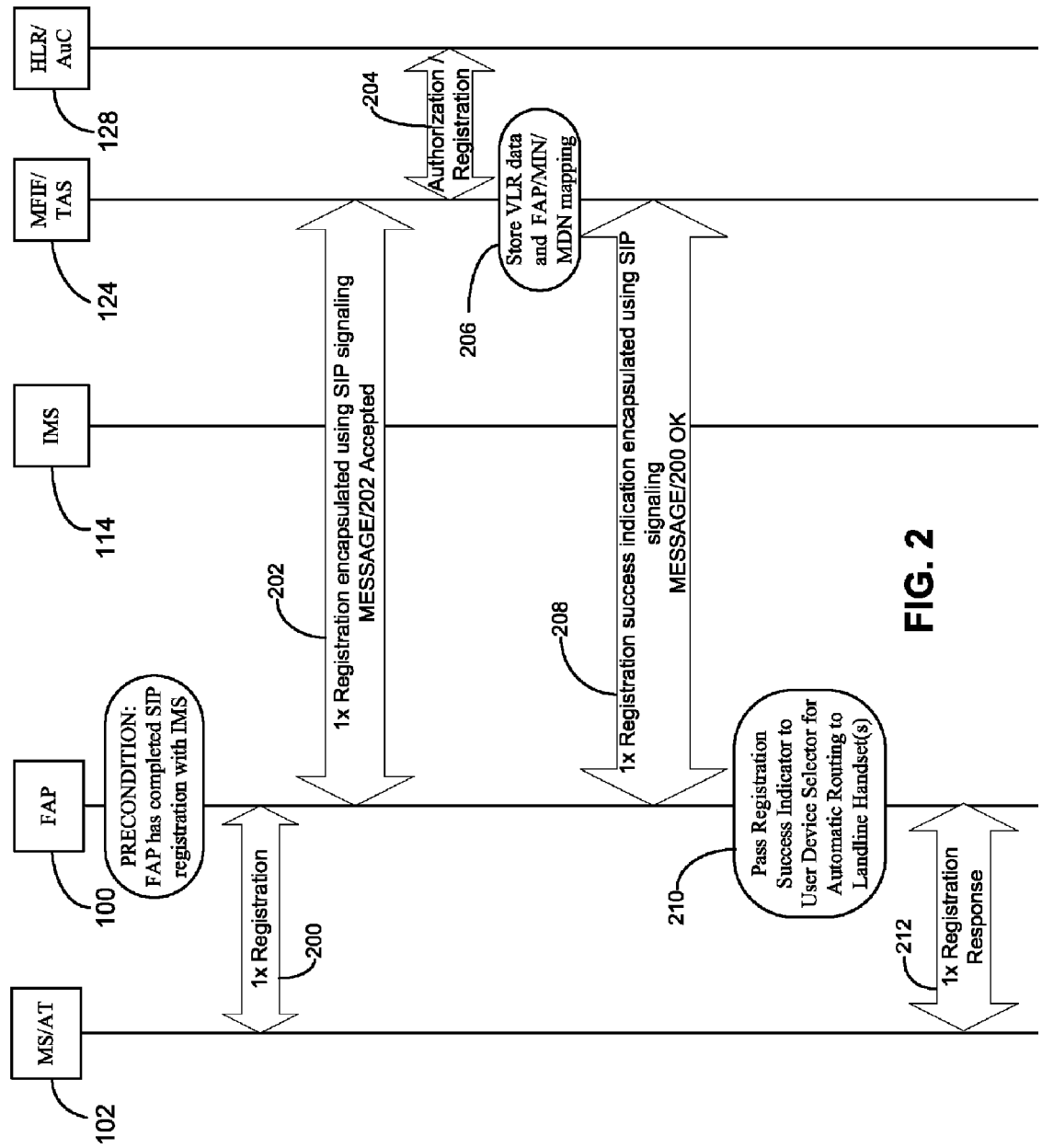
FIG. 2 is a flow diagram illustrating mobile handset registration with the femto access point of FIG. 1, including the associated user device selection, in accordance with an embodiment of the invention.

When the femto access point 100 completes its registration with the IMS core network 114, it is ready to register the mobile handset 102 in the mobile core network 118 via the air interface. With reference to FIG. 2, an embodiment of a mobile handset registration at the FAP 100, which triggers automatic routing of new communication session to the landline handset system 104, is shown. In steps 200-202, when the mobile handset 102 initiates a registration with the FAP 100 via the air interface, such as using 1× Registration, the FAP 100 encapsulates the 1× Registration in a SIP protocol compatible message, for example in a SIP MESSAGE, and sends it to the MFIF 124 through the IMS core network 114. The MFIF 214 returns a "202 Accepted" message back to the FAP 100 indicating that the registration request has been accepted and results are pending. In step 204, the MFIF 124 authenticates and registers the mobile handset 102 in the mobile core network 118 via the HLR 128 using the mobile credentials received via the SIP MESSAGE. In case of a successful registration of the mobile handset 102 at the HLR 128, the MFIF 124 also registers itself as the serving MSC and stores Visitor Location Register (VLR) information. At this point, MFIF 124 stores the mapping of femto access point/mobile identification number/mobile directory number (FAP/MIN/MDN) in order to route the calls to the mobile telephone number via the FAP 100, step 206. In step 208, MFIF 124 passes the result of the mobile handset's air interface registration to the FAP 100 encapsulated in the SIP MESSAGE. If the registration is successful, the MFIF 124 includes a Registration Success indicator as part of the SIP MESSAGE in order to indicate a successful registration request and passes the MDN of the mobile handset 102 to the FAP 100. The FAP 100 returns a "200 OK" message to the MFIF 124 to indicate completion of the registration request. Preferably, the Registration Success indicator is implemented as a new field (e.g., containing a "Y/N" indicator) in the SIP MESSAGE method extension of the Session Initiation Protocol. The SIP MESSAGE method extension of the SIP protocol is defined in the Internet Engineering Task Force RFC 3428, which is incorporated herein by reference in its entirety. Once a Call Control Module of the FAP 100 receives a "Y" indicator corresponding to the new Registration Success field in the SIP MESSAGE, it causes a User Device Selector Module 108 to automatically route any new calls destined for the mobile telephone number to the traditional phones 104a, 104b connected to the landline handset system 104, step 210.

Figure 3:
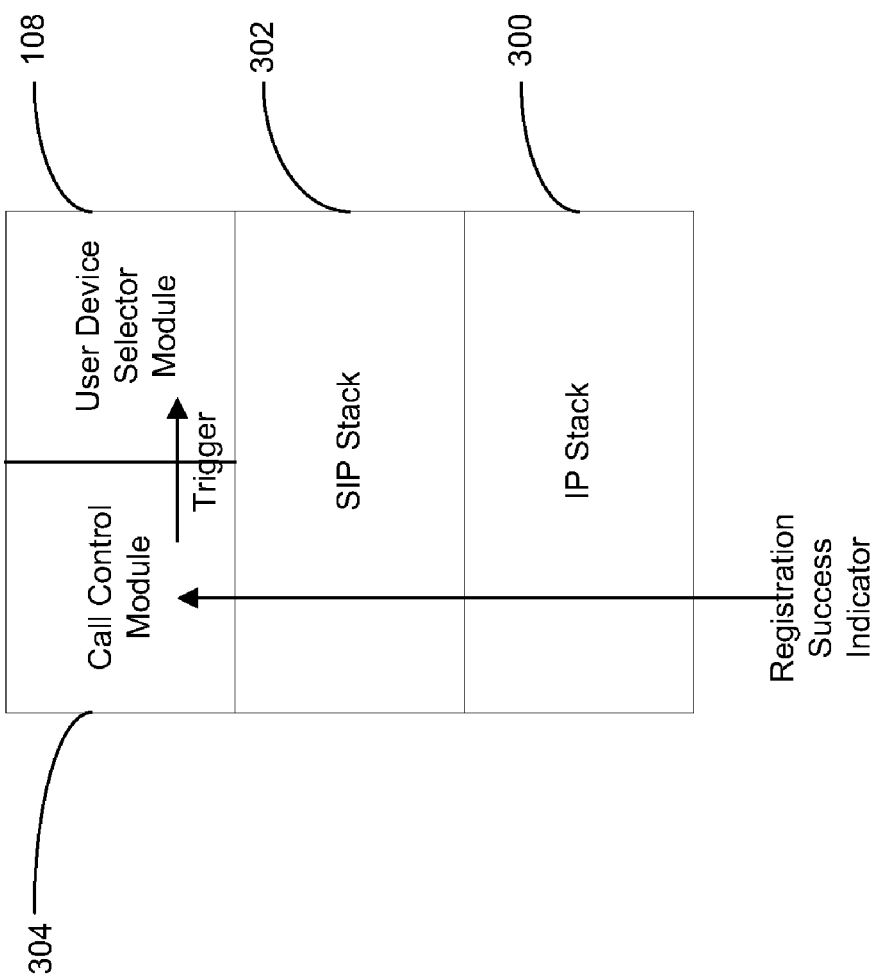
FIG. 3 is a schematic diagram illustrating a protocol stack of the femto access, in accordance with an embodiment of the invention.

Turning to FIG. 3, an embodiment of a protocol stack of the femto access point 100 is shown in further detail. When the mobile handset's registration request is successful, the FAP 100 receives a "Y" indicator corresponding to the newly defined Registration Success field included in the SIP MESSAGE. The SIP MESSAGE is received via the IP stack 300, which passes it on to the SIP Stack 302 for further processing. The SIP stack 302, in turn, parses the SIP MESSAGE received from the IP stack and passes the included Registration Success indicator on to the application layer. In an embodiment, the Registration Success indicator is received by the Call Control Module 304. The Call Control Module 304 is responsible for controlling the multiple communication interfaces of the FAP 100, including the air interface with the mobile handset 102, as well as the analog interface with the ATA 106/landline handset system 104. When the Call Control Module 304 receives the "Y" indicator within the Registration Success field of the SIP MESSAGE, it triggers an instruction to the User Device Selector Module 108 to automatically route new communication sessions originating or terminating via the FAP 100 through the traditional landline handsets 104a, 104b of the landline handset system 104 in accordance with a predetermined IMPU-to-IMPI(s) mapping. In an embodiment, the Call Control Module 304 stores in its memory the overall IMPU (e.g., one or more mobile handsets) to IMPI (e.g., one or more addressable ports at the ATA, each corresponding to a landline handset system) mapping for all handsets associated with the FAP 100. When the SIP MESSAGE includes a "Y" indicator in the mobile Registration Success field, the Call Control Module 304 issues an instruction to the User Device Selector Module 108 to route new calls destined to the mobile's MDN/IMPU to one or more ports at the ATA 106 corresponding to one or more particular landline handset systems (IMPIs). In another embodiment, the overall system IMPU-to-IMPI mapping is stored at the computer readable memory of the User Device Selector 108. In yet another embodiment, the overall IMPU-to-IMPI handset mapping is stored at the Femto Management Station (FMS) 132 (FIG. 1), which facilitates centralized administration of access to the FAP 100.

Thus, the User Device Selector Module 108 routes all calls via the FAP 100 to and from the traditional landline headsets, thereby ensuring a seamless transition of the mobile telephone number from the mobile headset 102 to the traditional landline headsets 104a, 104b without user intervention as soon as the mobile headset 102 is present in the vicinity of the FAP 100 and completes a successful registration process. In an embodiment, the Call Control Module 304 and the User Device Selector Module 108 are implemented as firmware executing in computer readable memory of the FAP 100, such as in RAM, ROM, flash, or hard drive memory. However, those skilled in the art will realize that alternate implementations of the Call Control Module 304 and User Device Selector Module 108 are possible. For instance, in additional embodiments, the modules 108, 304 are implemented via a stand-alone hardware component of the FAP 100, such as via one or more Field-Programmable Gate Arrays (FPGA).

Figure 4:
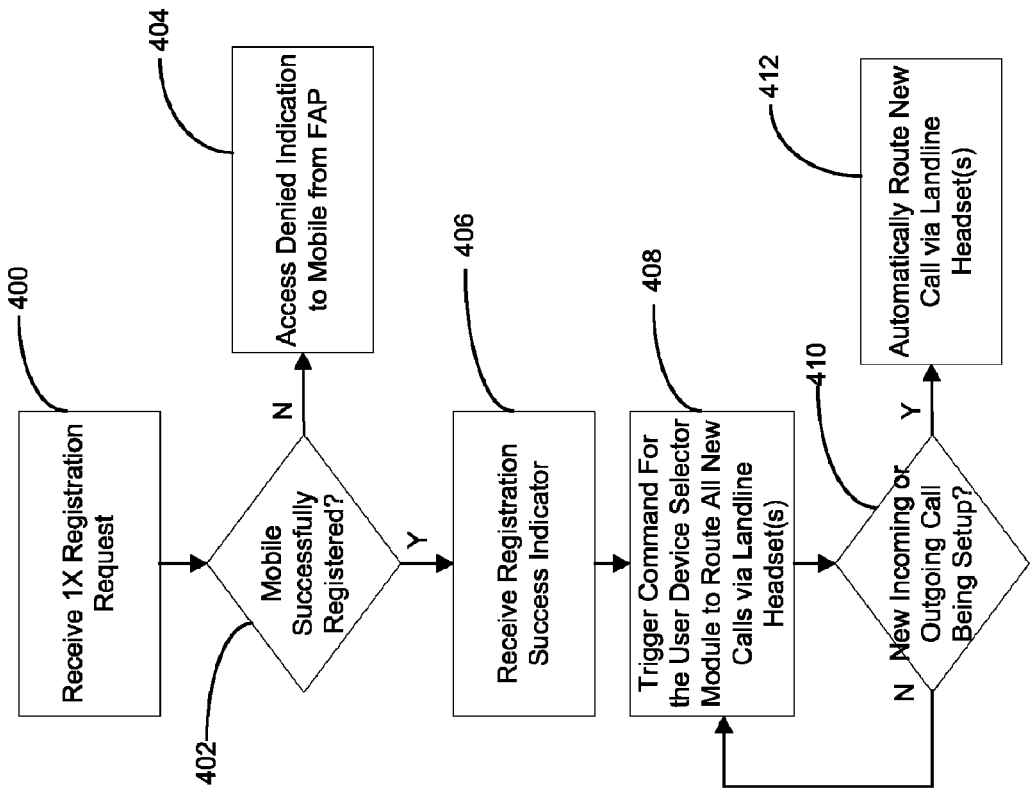
FIG. 4 is a flow chart of a method for routing a new communication session among the mobile phone headset and one or more traditional landline phone headsets, in accordance with an embodiment of the invention.

Turning to FIG. 4, an embodiment of a method for routing a new communication session among the mobile phone headset 102 and one or more traditional landline phone headsets 104a, 104b is shown. In step 400, the FAP 100 receives a 1× Registration request message from the mobile phone headset 102 and passes the registration request on to the MFIF 124 and HLR 128 by encapsulating the request in SIP signaling, as described above. If the registration request is successful, the FAP 100 receives a registration success indication as part of a new field defined in the SIP MESSAGE, which is received via the SIP user agent 112, steps 402, 406. Otherwise, the mobile 102 receives an indication from the FAP 100 that access is denied, step 404. If the femto access point 100 receives an indicator of successful registration of the mobile 102 at the wireless core network 118, the Call Control Module 304 triggers a command to the User Device Selector Module 108 indicating that newly established communication sessions via the FAP 100 should be automatically set up on the traditional landline headsets 104a, 104b instead of the mobile telephone headset 102, step 408. Thus, when a new incoming call is received at the FAP 100, the User Device Selector 108 forwards the ring tone to the traditional landline headsets 104a, 104b of the landline headset system 104. Likewise, when the user desires to make an outgoing call, the User Selector Module 108 provides the landline headsets 104a, 104b with a dial tone via the ATA 106, steps 410-412.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for providing a landline telephone service replacement by routing, via a femto cell comprising a femto access point, a new communication session to landline end user devices connected via an analog telephone interface to the femto access point, the method comprising:
   relaying, by the femto access point to a mobile network home location register, a registration request from a mobile wireless device;
   receiving, by the femto access point in response to the registration request, a registration success indication notifying the femto access point that the mobile wireless device is registered to engage in the new communication session via the femto cell; and
   in response to receiving the registration success indication for the mobile wireless device:
      (a) triggering, within the femto access point, a user device selector to route the new communication session to landline end user devices connected via the analog telephone interface to the femto access point; and
      (b) routing, by the femto access point after the triggering, the new communication session, to the landline end user devices via the analog telephone interface.

2. The method of claim 1 wherein the mobile wireless device is a mobile phone handset.

3. The method of claim 1 wherein at least one of the landline end user devices is a landline telephone handset.

4. The method of claim 1 wherein the mobile wireless device is compliant with a CDMA2000 1× communication standard.

5. The method of claim 4 wherein the registration request from the mobile wireless device is a 1× Registration message.

6. The method of claim 1 further comprising encapsulating the registration request issued by the femto access point and the registration success indication, received by the femto access point, using a Session Initiation Protocol (SIP) signaling.

7. The method of claim 6 wherein the SIP signaling comprises a SIP MESSAGE extension of a SIP protocol, the method further comprising adding a new field corresponding to the registration success indication to the SIP MESSAGE.

8. The method of claim 1 further comprising:
conducting the new communication session via the analog telephone interface in accordance with the routing step;
receiving user input for transferring the new communication session from a landline end user device connected to the analog telephone interface to the mobile wireless device;
re-routing the new communication session to the mobile wireless device; and
disconnecting the landline end user device from the new communication session.

9. The method of claim 8 wherein the user input comprises an access code entered via the landline end user device during the new communication session.

10. The method of claim 1 further comprising:
receiving user input for transferring an existing communication session maintained by the mobile wireless device to the analog telephone interface for the landline end user devices;
routing the existing communication session to the landline end user devices via the analog telephone interface; and
disconnecting the mobile wireless device from the existing communication session.

11. The method of claim 10 wherein the user input comprises an access code entered via the mobile wireless device during the existing communication session.

12. The method of claim 1 wherein the mobile wireless device and the landline end user devices connected to the analog telephone interface share a single telephone number.

13. The method of claim 1 wherein the mobile wireless device is compliant with a CDMA2000 1× communication standard and the new communication session is a voice communication session via the analog telephone interface, the method further comprising contemporaneously engaging in a data communication session via the mobile wireless device.

14. The method of claim 1 further comprising:
conducting a first voice communication session via one of the mobile wireless device and the landline end user devices;
receiving a call waiting notification indicative of an incoming second voice communication session; and
routing the incoming second voice communication session to an idle one of the mobile wireless device and the analog telephone interface, for the landline end user devices, that is not involved in the first voice communication session.

15. A femto cell comprising a femto access point for setting up a new communication session for at least one landline end user device connected via an analog telephone interface to the femto access point, the femto access point comprising:
a communication interface for engaging in the new communication session with the at least one landline end user device via the analog telephone interface, the communication interface relaying a registration request from a mobile wireless device to a home location register of a mobile telephone network and receiving, in response to the registration request, a registration success indication notifying the femto access point that the mobile wireless device is registered to engage in the new communication session via the femto cell; and
a user device selector for routing the new communication session to landline end user devices connected via the analog telephone interface to the femto access point, the user device selector routing the new communication session to the landline end user devices via the analog telephone interface in response to receiving the registration success indication for the mobile wireless device.

16. The femto cell of claim 15 wherein the mobile wireless device is a mobile phone handset.

17. The femto cell of claim 15 wherein at least one of the landline end user devices is a landline telephone handset.

18. The femto cell of claim 15 wherein the mobile device is compliant with a CDMA2000 1× communication standard and the registration request from the first user device is a 1× Registration message.

19. The femto cell of claim 15 wherein the registration request issued by the femto access point and the registration success indication received by the femto access point are encapsulated via a Session Initiation Protocol (SIP) signaling.

20. The femto cell of claim 19 wherein the SIP signaling comprises a SIP MESSAGE extension of a SIP protocol, the registration success indication comprising a new field in the SIP MESSAGE.

21. The femto cell of claim 15 wherein the new communication session is routed to the analog telephone interface and the femto cell receives user input for transferring the new communication session from device landline end user device connected to the analog telephone interface to the mobile wireless device.

22. The femto cell of claim 21 wherein the user input comprises an access code entered via the landline end user device during the new communication session.

23. The femto cell of claim 15 wherein the femto access point receives user input for transferring an existing communication session maintained by the mobile wireless device to the analog telephone interface for the landline end user devices.

24. The femto cell of claim 23 wherein the user input comprises an access code entered via the mobile wireless device during the existing communication session.

25. The femto cell of claim 15 wherein the mobile wireless device and the landline end user devices connected to the analog telephone interface share a single telephone number.

26. The femto cell of claim 15 wherein the mobile wireless device is compliant with a CDMA2000 1× communication standard, the mobile wireless device being capable of engaging in a data communication session when the one of the landline end user devices connected to the analog telephone interface contemporaneously engages in the new communication session via the femto access point, the new communication session being a voice communication session.

27. The femto cell of claim 15 wherein the communication interface is adapted to conduct a first voice communication session via one of the mobile wireless device and the landline end user devices via the analog telephone interface, the user device selector is adapted to receive a call waiting notification indicative of an incoming second voice communication session and routing the incoming second voice communication session to an idle one of the mobile wireless device and the analog telephone interface, for the landline end user devices, that is not involved in the first voice communication session.

28. A system for providing a landline telephone service replacement for landline end user devices, the system comprising:
a mobile telephone network for communicating with a mobile wireless device; and
a femto cell including a femto access point coupled to landline end user devices via an analog telephone interface, the femto access point also being coupled to the mobile telephone network, the femto access point being adapted to initiate setting up a new communication session for at least one of the landline end user devices via the analog telephone interface, the femto access point being adapted to relay a registration request from the mobile wireless device to the mobile telephone network, and the femto access point being further adapted to receive a registration success indication notifying the femto access point that the mobile wireless device is registered to engage in the new communication session via the femto cell, the femto access point being further adapted to route the new communication session to the landline end user devices, via the analog telephone interface, in response to receiving the registration success indication for the mobile wireless device.

29. The system of claim 28 further comprising an IP Multimedia Subsystem (IMS) core network coupled to the mobile telephone network and the femto cell for providing Internet Protocol multimedia services to the mobile wireless device, wherein the registration request and the registration success indication are encapsulated via a Session Initiation Protocol (SIP) signaling and relayed between the femto access point and the mobile telephone network via the IMS core network.

30. The system of claim 29 wherein the SIP signaling comprises a SIP MESSAGE extension of a SIP protocol, the registration success indication comprising a new field in the SIP MESSAGE.

31. The system of claim 28 wherein the analog telephone interface is an analog telephone adapter adapted to couple a landline telephone handset to the femto access point.

32. The system of claim 28 wherein the mobile wireless device is a mobile telephone handset.

33. The system of claim 28 wherein the new communication session is routed to the analog telephone interface and the femto access point receives user input for transferring the new communication session from the landline end user devices connected to the analog telephone interface to the mobile wireless device, the user input comprising an access code entered via one of the landline end user devices during the new communication session.

34. The system of claim 28 wherein the femto access point receives user input for transferring an existing communication session maintained by the mobile wireless device to the analog telephone interface connected to the landline end user devices, wherein the user input comprises an access code entered via the mobile wireless device during the existing communication session.

35. The system of claim 28 wherein the mobile wireless device and the landline end user devices connected to the analog telephone interface share a single telephone number.

36. The system of claim 28 wherein the mobile wireless device is compliant with a CDMA2000 1× communication standard, and the mobile wireless device is capable of engaging in a data communication session when one of the landline end user devices contemporaneously engages in the new communication session via the femto access point, the new communication session being a voice communication session.

37. The system of claim 28 wherein the femto access point is adapted to support a first voice communication session via one of the mobile wireless device and the landline end user devices, via the analog telephone interface, the femto access point being adapted to receive a call waiting notification indicative of an incoming second voice communication session and routing the incoming second voice communication session to an idle one of the mobile wireless device and the landline end user devices that is not involved in the first voice communication session.

\* \* \* \* \*